(12) United States Patent
Tench et al.

(10) Patent No.: US 6,256,135 B1
(45) Date of Patent: *Jul. 3, 2001

(54) DIFFUSELY-REFLECTING REVERSIBLE ELECTROCHEMICAL MIRROR

(75) Inventors: D. Morgan Tench; Leslie F. Warren, Jr., both of Camarillo; Michael A. Cunningham, Thousand Oaks, all of CA (US)

(73) Assignee: Rockwell Science Center, LLC, Thousands Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/410,154

(22) Filed: Sep. 30, 1999

Related U.S. Application Data

(63) Continuation-in-part of application No. 09/333,385, filed on Jun. 15, 1999, now Pat. No. 6,166,847, which is a continuation-in-part of application No. 08/994,412, filed on Dec. 19, 1997, now Pat. No. 5,923,456.

(51) Int. Cl.$^7$ ...................................................... G02F 1/155
(52) U.S. Cl. ........................ 359/271; 359/265; 359/266; 359/272; 359/275; 359/270
(58) Field of Search ................................. 359/265, 266, 359/271, 272, 275, 270

(56) References Cited

U.S. PATENT DOCUMENTS

| | | | |
|---|---|---|---|
| 5,056,899 | 10/1991 | Warszawski | 359/272 |
| 5,923,456 | * 7/1999 | Tench et al. | 359/266 |

FOREIGN PATENT DOCUMENTS

| | | |
|---|---|---|
| 0712025 | 5/1996 | (EP) . |
| 2504290 | 4/1981 | (FR) . |

OTHER PUBLICATIONS

J. Duchene, et al., "Electrolytic Display", (1979), *IEEE Transactions on Electron Devices*, vol. ED–26, No. 8, pp. 1243–1245.

* cited by examiner

*Primary Examiner*—Evelyn A Lester
(74) *Attorney, Agent, or Firm*—Koppel & Jacobs

(57) ABSTRACT

A reversible electrochemical mirror device includes a substantially transparent first electrode having a textured surface, and a second electrode which may be distributed in localized areas. An electrolytic solution, disposed between the first and second electrodes, contains ions of a metal which can electrodeposit on the electrodes. A negative electrical potential applied to the first electrode causes deposited metal to be dissolved from the second electrode into the electrolytic solution and to be electrodeposited from the solution onto the textured surface of the first electrode, thereby affecting the reflectivity of the device for electromagnetic radiation. Because of the textured surface, light striking the first electrode is diffusely reflected, making the device desirable for architectural and automotive glass applications. A surface modification layer applied to the first electrode ensures that the electrodeposit is substantially uniform. A positive electrical potential applied to the first electrode causes deposited metal to be dissolved from the first electrode and electrodeposited from the solution onto the second electrode, thereby decreasing the reflection of radiation by the device.

39 Claims, 3 Drawing Sheets

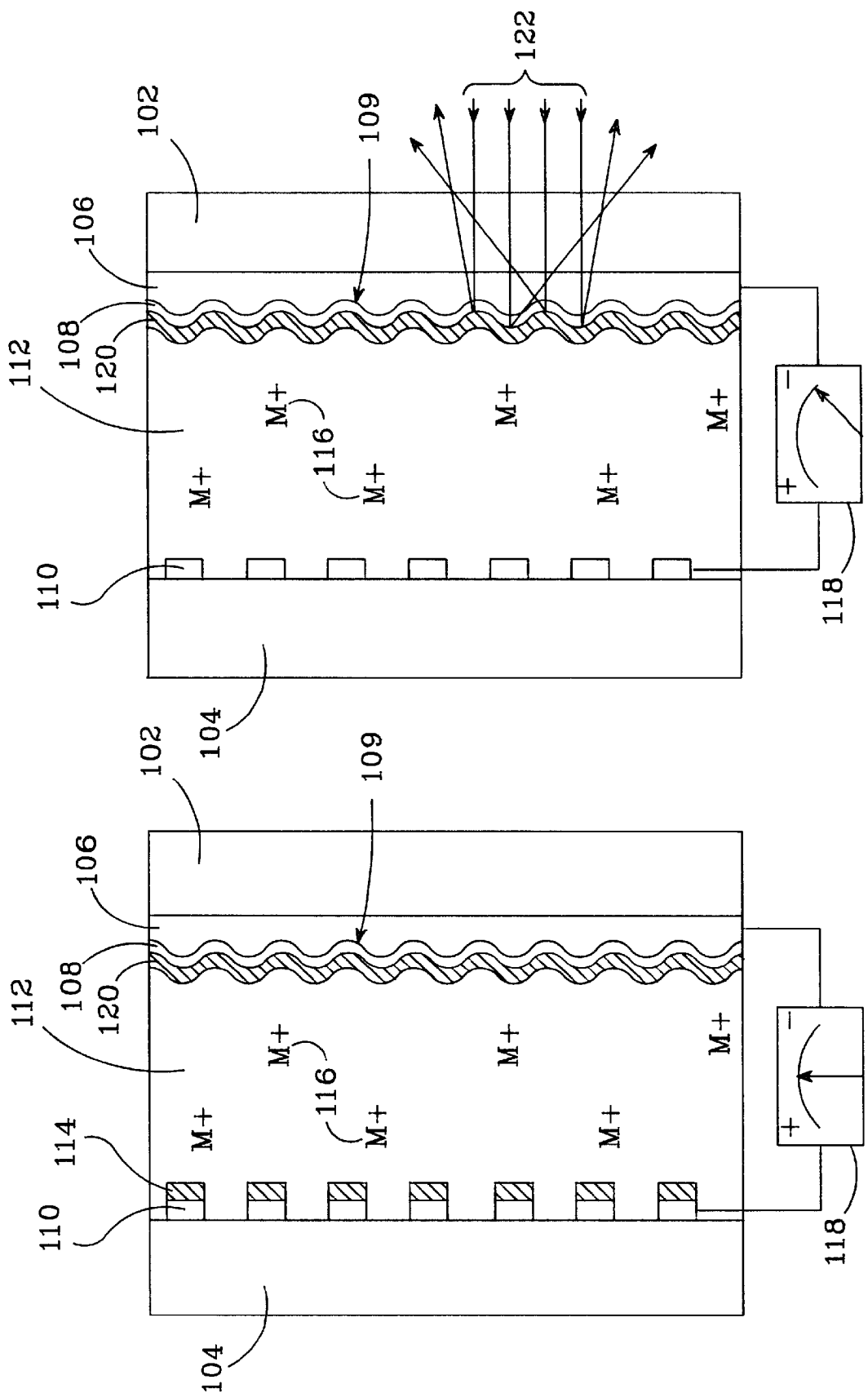

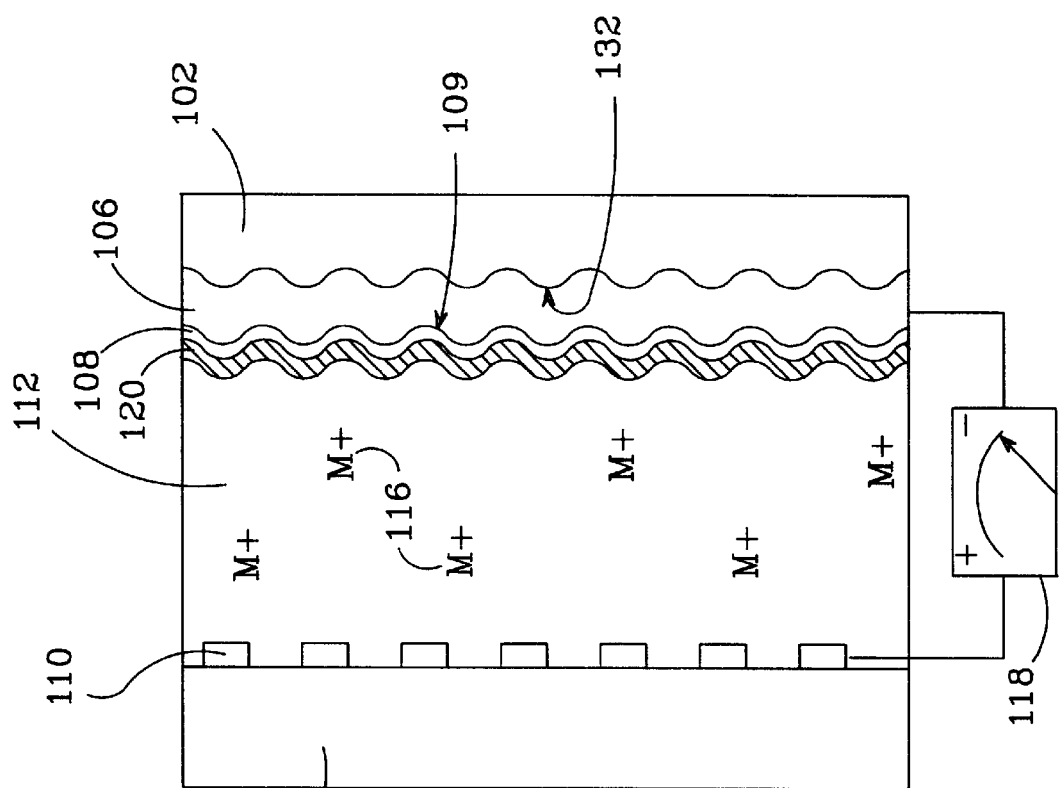
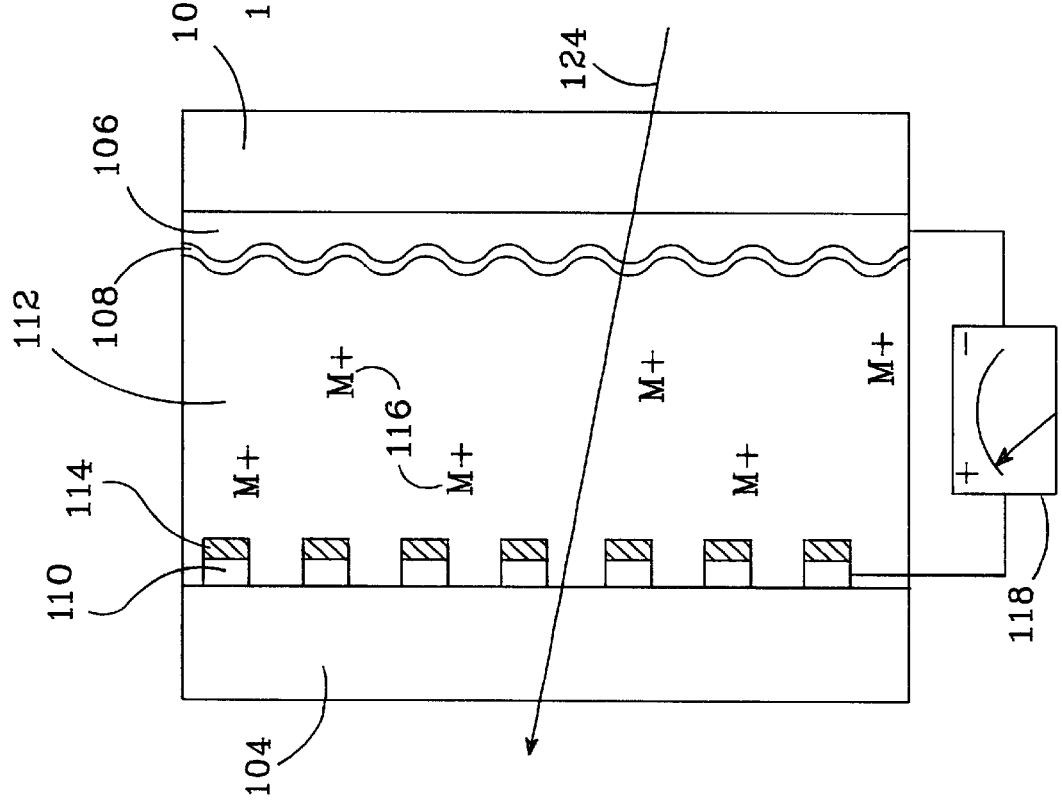
FIG. 3
FIG. 4

DIFFUSELY-REFLECTING REVERSIBLE ELECTROCHEMICAL MIRROR

CROSS REFERENCE TO RELATED APPLICATIONS

This invention is a continuation-in-part of application Ser. No. 09/333,385, filed Jun. 15, 1999, now U.S. Pat. No. 6,166,847, pn Dec. 26, 2000 which is a continuation-in-part of application Ser. No. 08/994,412, filed Dec. 19, 1997, which issued as U.S. Pat. No. 5,923,456 on Jul. 13, 1999.

BACKGROUND OF THE INVENTION

This invention is concerned with devices, such as mirrors and windows, having controllable transmittance and reflectivity.

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. These approaches are only partially effective, since the window itself is heated and because these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable low voltage smart window that can be adjusted between transmissive and reflective states. Reflecting the light, rather than absorbing it, is the most efficient means for avoiding inside heating.

In prior art attempts to exploit reversible electrodeposition of a metal for light modulation, the deposits obtained on transparent substrates presented a rough and black, gray, or sometimes colored appearance (typical of finely-divided metals) and exhibited poor reflectivity and high light absorbance, especially when thick. This was true in the work of Udaka, for example, even when the transparent conductor electrode surface had been metallized (Udaka, et al., published European Patent Application No. 0712025, Application No. 95117797.1). Such deposits have been investigated for display applications involving reflectance from the background, with white pigments often being added to improve contrast. Warszawski (U.S. Pat. No. 5,056,899), which is concerned with displays, teaches that reversible metal electrodeposition is most appropriate for display applications, since significant disadvantages for transmission devices were given (e.g., the possibility of blocking radiation via metal deposition at the counter electrode). Such teachings imply that the application of reversible metal deposition to smart windows must involve light absorption by the finely divided electrodeposited metal, which would result in heating of the device itself and thus the space inside. The prior art literature also teaches that, for transmission-type devices, reversible metal electrodeposition requires the use of an auxiliary counter electrode reaction; otherwise, metal would plate on the counter electrode as the deposit was de-plated from the working electrode.

Electrolytes described in the prior art literature contain auxiliary redox species (e.g., bromide, iodide, or chloride) that are oxidized (e.g., to bromine, iodine, or chlorine) at the counter electrode during metal deposition, introducing chemistry-related instabilities during long term operation and greatly reducing the memory effect by causing dissolution of the metal deposit on open circuit, e.g., $2Ag^0 + Br_2 \rightarrow 2AgBr$. In most cases, this auxiliary redox process hinders metal deposition at the counter electrode during erasure of the light modulating deposit, introducing a threshold voltage that is desirable for display applications. This auxiliary redox process represents a significant side reaction even when metal plating/deplating occurs at the counter electrode and a threshold voltage is not observed. See, e.g., Warszawski, Columns 3–4 (when copper or nickel were present in the counter electrode paste) and Duchene, et al., Electrolytic Display, IEEE Transactions on Electron Devices, Volume ED-26, Number 8, Pages 1243–1245 (August 1979); French Patent No. 2,504,290 (Oct. 22, 1982). High switching voltages of at least 1 V were used for all the electrodeposition devices which have been found in the patent and literature prior art.

Warszawski teaches that the use of a grid counter electrode would give a less uniform deposit since deposition on the transparent working electrode is highly localized in the vicinity of the counter electrode grid lines (a consequence of the very thin film of gel electrolyte used). Warszawski also teaches the use of an aqueous gel electrolyte to minimize sensitivity to atmospheric contaminants and to avoid the necessity of having a leak tight seal. Such electrolytes, however, have much more limited temperature and voltage operating ranges compared with organic-based electrolytes with high boiling solvents.

Prior art literature teaches that the memory effect is temporary. This is a consequence of the occurrence of a counter electrode reaction other than metal plating/deplating. The energetic oxidation products generated at the counter electrode can cause dissolution of the metal deposit on the working electrode either chemically on open circuit (slow) or electrochemically during short circuit (fast).

None of the reversible electrodeposition devices known in the prior art have exhibited high-reflectivity mirror deposits as needed for applications requiring adjustable reflectivity. Such deposits have recently been obtained via the use of a surface modification layer by the inventors of the present invention, as disclosed in co-pending patent application Ser. No. 09/333,385, filed Jun. 15, 1999, which is assigned to the same assignee as the present case. The reversible electrochemical mirror (REM) deposits obtained in this case, however, exhibited a high degree of specular reflectivity, which is not always desirable. For example, light from the sun or automobile headlights specularly reflected from REM windows in buildings or automobiles might injure the eyes of bystanders, or might create a safety hazard by temporarily blinding people, especially those driving automobiles. In fact, many governments, particularly in Europe, expressly prohibit highly reflective windows and have imposed maximum reflectivity standards that must be complied with. On the other hand, the heat and light-rejecting characteristics afforded by REM smart windows are still very beneficial. Thus, a need exists for a REM smart window which can be adjusted between transmissive and reflective states, while avoiding the blinding effect that can result from specularly reflecting surfaces, i.e., those that reflect in a highly directional way.

SUMMARY OF THE INVENTION

A reversible electrochemical mirror (REM) device is presented which permits efficient and precise control over the propagation and reflection of visible light and other electromagnetic radiation. The device includes a transparent first electrode which has a textured (physically irregular)

surface, a surface modification layer on the first electrode, and a second electrode which, in a preferred embodiment, is distributed in localized areas. An electrolytic solution is disposed between the first and second electrodes such that ions of a metal which can electrodeposit on the first and second electrodes are soluble in the electrolytic solution.

When a negative electrical potential is applied to the first electrode relative to the second electrode, the applied potential causes deposited metal to be dissolved from the second electrode into the electrolytic solution and to be electrodeposited from the solution onto the textured surface of the first electrode. The surface modification layer facilitates substantially uniform nucleation of the electrodeposited metal to form a mirror deposit on the first electrode, such that the amount of deposited metal subsisting on the first electrode affects the reflectivity of the device for the radiation. The mirror metal electrodeposited on the first electrode is highly reflecting to the radiation, but because the electrode surface is textured, radiation striking the mirror electrodeposit is reflected diffusely, i.e., at various angles rather than a single angle, making the device suitable for uses such as architectural and automotive glass. Conversely, when the polarity is reversed and a positive electrical potential is applied to the first electrode relative to the second electrode, the applied potential causes deposited mirror metal to be dissolved from the first electrode and electrodeposited from the solution onto the second electrode, thereby decreasing the reflectivity of the device.

The locally-distributed second electrode is substantially transparent, allowing radiation to pass through the device when mirror metal is dissolved from the textured surface of the first electrode and electrodeposited on the second electrode. Thus, by simply applying a voltage (or current), the device is selectively adjusted between highly transmissive and diffusely reflective states. The diffuse reflectivity of the mirror deposit can be selectively adjusted from near 0% to almost 100%, depending on the amount of mirror metal deposited. Alternatively, the second electrode can be a continuous electrode to simplify fabrication of devices not requiring transmission, or to enable other device attributes.

The textured surface of the first electrode preferably consists of rounded hills and troughs, with sharp points avoided to insure uniform electrodeposition of mirror metal. The surface texture of the first electrode is preferably provided via texture in the surface of the transparent glass or plastic substrate, which introduces similar texture in the conformal transparent conductor and surface modification layers comprising the first electrode. Surface texture may also be introduced directly into the transparent conductor layer. The surface modification layer may be a thin layer (i.e., sufficiently thin to be nominally transparent) of an inert metal which is electrochemically more stable against oxidation than the electrodeposited mirror metal. The surface modification layer may also be disposed uniformly on the first electrode, or may be disposed in a pattern. An underlayer may be added between the first electrode and the surface modification layer to improve adhesion.

The electrolytic solution may be immobilized within a polymer matrix, or may include a gelling agent to form an aqueous or a non-aqueous gel electrolyte. Ceramic powder fillers may be used to form a "solid" electrolyte or to augment gel electrolyte characteristics.

In various embodiments, the second electrode may be a continuous electrical conductor, such as an electrochemically stable metallic mesh pattern on a glass substrate, or a discontinuous metallic film, such as a dot matrix pattern on a transparent conducting film on glass. Alternatively, for a non-transmissive device, the second electrode can be a solid non-transparent conductor or a continuous electrical conductor on a solid non-transparent insulator substrate. An underlayer may be provided between the second electrode and the second substrate to improve adhesion.

DESCRIPTION OF THE DRAWINGS

FIG. 1 is a cross sectional view depicting the general design of a transmissive REM device constructed according to the invention.

FIG. 2 is a cross sectional view similar to FIG. 1, but illustrating the state of the device when a negative electrical potential has been applied to the first electrode relative to the second electrode for a sufficient time to cause substantially all of the mirror metal to deposit onto the textured surface of the first electrode.

FIG. 3 is a cross sectional view similar to FIGS. 1 and 2, but depicting the state of the device when a positive electrical potential has been applied to the first electrode relative to the second electrode for a sufficient time to cause substantially all of the mirror metal to deposit on the second electrode.

FIG. 4 is a cross sectional view similar to FIG. 1, but which includes the use of a textured surface on the first substrate to induce texture in the first electrode surface.

DESCRIPTION OF THE INVENTION

Figure 5:
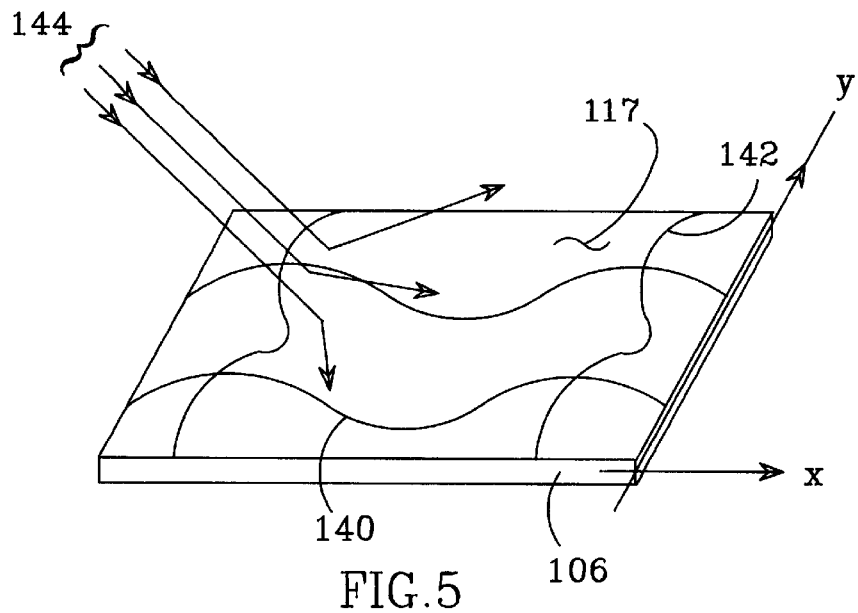
FIG. 5 is a perspective view of an exemplary textured surface suitable for use with a first electrode according to the invention.

FIG. 1 is a cross sectional view depicting the general design of an electrochemical device constructed according to our invention (some dimensions, particularly layer thicknesses, are disproportionate in the drawings in order to more effectively illustrate the structure and function of the invention). The device, which allows precise, reversible control over the propagation and reflection of at least a portion of the spectrum of electromagnetic radiation, includes a first substrate 102 and a second substrate 104, each of which is substantially transparent to the radiation to be controlled. An electrically conducting film 106, e.g., indium tin oxide (ITO) or fluorine-doped tin oxide (FTO), which is substantially transparent to radiation, is deposited on the first substrate. The film 106, with the addition of an electrochemically stable surface modification layer 108 applied as a conformal coating, functions as a first electrode. The surface 109 of first electrode 106 is "textured", as discussed in detail below. A second electrode 110 is deposited in localized regions on the second substrate 104.

An electrolytic solution 112 is located between and in electrical contact with the electrodes 106 and 110. Prior to assembly, the device may be initially charged by depositing a mirror metal layer 114 on the electrode 110 or a mirror metal layer 120 on electrode 106, or by distributing the mirror metal charge as partial deposits between electrodes 110 and 106, which is the configuration shown in FIG. 1. If the electrode 110 is not itself composed of the mirror metal, the amount of metal in these initially deposited layers constitutes the maximum amount of mirror metal which will be available for deposit, as explained in more detail below, to control the reflectivity of the device. Metal ions 116, which contain the same mirror metal atoms as layers 114 and 120, are dissolved within the electrolytic solution 112 such that the metal atoms in solution can be reversibly electrodeposited on and electrodissolved from the first and second electrodes. The surface modification layer 108 applied to the first electrode 106 facilitates nucleation on this electrode of electrodeposited mirror metal from the ions 116 to produce a highly-reflecting, mirror-like deposit. Note that mirror metal could be electrochemically deposited on one of the electrodes after device assembly, without prior charging of the cell with mirror metal, but this would involve production of energetic species at the anode, e.g., halogen from a halide electrolyte, which might adversely affect the stability of the device.

Unlike the first electrode 106 and its surface modification layer 108, which are deposited over all of surface 109, second electrode 110 is, in a preferred embodiment, distributed in localized areas on second substrate 104. Second electrode 110 may be a mesh or grid of an electrochemically stable metal, e.g., Pt or Au, and may include an underlayer of another metal, e.g., Ti, Cr or Ni, to improve adhesion to substrate 104. Alternatively, second electrode 110 might be comprised of a uniform layer of a transparent conducting material, e.g., ITO or FTO, having an electrochemically stable metal nucleation layer distributed in a grid or dot matrix pattern so as to cause electrodeposition of mirror metal 114 only in localized areas at the voltage used. In some embodiments of this invention not requiring that light be transmitted through the device, second electrode 110 may be a solid material or a uniform metal film that is not distributed in localized areas.

An essential aspect of the invention is the presence of textured surface 109 on the electrolyte side of first electrode 106. As used herein, a "textured surface" is non-planar, typically on a small scale, such that a light beam of appreciable thickness striking the surface at a given angle is reflected from the surface at more than one angle so that the intensity of the reflected light at any given angle is diminished compared to that of the incident light. Thus, incident radiation striking the textured surface of the first electrode is reflected diffusely, in that the reflection angle relative to the average electrode surface, neglecting the texture, for at least some of the reflected radiation differs from the overall angle of incidence. An example of a textured surface is shown in FIG. 1: the surface 109 of first electrode 106 adjacent to surface modification layer 108 is textured, consisting of a periodic pattern of rounded hills and troughs. For some applications, a random or non-periodic texture pattern will be desirable to avoid undesirable light diffraction effects or visual patterns. Because surface modification layer 108 is typically deposited onto the first electrode as a very thin layer, it necessarily conforms to the textured surface of the first electrode. Likewise, for the thin electrodeposits typically used in REM devices, mirror metal layer 120 will also substantially conform to the textured surface 109 of first electrode 106 and will exhibit diffuse reflection.

The device is intended for use in conjunction with a source of electrical potential 118, which has a reversible polarity and adjustable or pre-set positive and negative potential values, connected between the first and second electrodes 106 and 110. When a negative electrical potential is applied to the first electrode 106 relative to the second electrode 110, mirror metal 114 deposited on the second electrode 110 will dissolve from the second electrode into the electrolytic solution 112, while metal ions 116 in the solution will electrodeposit from the solution to form or increase the thickness of mirror metal layer 120 on the textured surface modification layer 108 of the textured first electrode 106 (as shown in FIG. 2). The overall reflectivity of the REM device will increase as mirror metal is deposited on first electrode 106. Because the electrodeposited mirror metal layer substantially conforms to the textured surface, the local angle of the mirror deposit 120 varies along the surface 109 of electrode 106. A large fraction of the light can still be reflected by the electrodeposited mirror metal layer 120, but because of the textured nature of the deposit, the light is diffusely reflected in many directions so that the intensity in any given direction is greatly diminished. To an observer, the device in the reflective mode would have a metallic luster, similar to a roughened metal or metallic paint, but would not exhibit a high degree of specular reflection. The appearance of the reflected light would depend on the shape, size, periodicity and amplitude of the texture features. Shallow, smooth features with large periods would, on the average, involve fewer internal surface reflections and would provide less light diffusion but higher overall reflectance.

When the polarity of the applied potential is reversed, such that a positive potential is applied to the first electrode 106 relative to the second electrode 110, deposited mirror metal 120 will dissolve from the first electrode into the solution 112 and dissolved mirror metal ions 116 will electrodeposit from the solution onto the second electrode. Because second electrode 110 is distributed in localized areas on the second substrate 104, it is substantially transparent. Light is thus allowed to propagate through the device with less hindrance when dissolved mirror metal is electroplated onto the second electrode (as shown in FIG. 3).

The amount of deposited mirror metal 120 which remains on the first electrode 106 will determine the reflectivity which the device demonstrates for radiation. The process is reversible and may be maintained at virtually any point between substantially complete deposition on and substantially complete erasure of mirror metal from the first electrode 106 (as illustrated in FIGS. 2 and 3, respectively). Thus, the mirror deposit may be adjusted to any point between approximately 0% reflectivity and a maximum reflectivity percentage determined by the surface texturing of the first electrode. The lower limit of reflectivity for the device is also affected by the reflectivities and absorptivities of the surface modification layer 108, the transparent conductor 106, and the substrate 102. Unwanted reflectance/absorption may be reduced by use of anti-reflection coatings of the type commonly employed, or by adjusting the layer thicknesses.

FIG. 2 is a cross sectional view similar to FIG. 1, but illustrating the performance of the device when sufficient negative electrical potential has been applied to the first electrode relative to the second electrode for a sufficient period of time to cause substantially all of the available mirror metal to dissolve from second electrode 110 and to deposit onto the surface modification layer 108 of first electrode 106 to provide maximum overall device reflectivity, which can approach 100%. In this condition, the layer 120, created by the deposited mirror metal, substantially conforms to the contours of surface modification layer 108, which are defined by the textured surface 109 of first electrode 106. The texturing causes light 122 that enters the device from a particular direction to be reflected in a number of different directions. The overall reflectivity of the device, and consequently its effectiveness, are not necessarily diminished by the nonspecular reflection, but because reflection in a given direction can be mitigated, the device can be made to comply with applicable reflectivity standards.

FIG. 3 is a cross sectional view similar to FIGS. 1 and 2, but illustrating the behavior of the device when sufficient positive electrical potential has been applied to the first electrode 106 relative to the second electrode 110 for a sufficient period of time to cause substantially all of the mirror metal 120 to dissolve from the first electrode into electrolytic solution 112, and to deposit as the metallic layer 114 on the locally-distributed second electrode 110. In this condition, the device will impose a minimal impediment to incoming radiation, thereby allowing substantially all such incoming radiation to be transmitted through the substantially transparent first substrate 102, first electrode 106, surface modification layer 108, and electrolytic solution 112, and then through the gaps in second electrode 110 and out of the device through the transparent second substrate 104, as illustrated by the light beam 124. For the configuration depicted in FIG. 3, the amount of reflected light will be minimal, determined by the reflectivities of substrate 102, electrode 106 and surface modification layer 108. However, some additional light may be lost via refraction if the refractive indices for the electrolyte 112 and the first electrode components 106 and 108 are not matched, especially if the texture on electrode 106 involves sharp peaks and edges.

A preferred embodiment of the present invention is shown in FIG. 4. The structure is similar to that shown in FIGS. 1–3, except that the inner surface 132 of the first substrate 102 is also textured. Texturing substrate surface 132 in this way simplifies the fabrication of the device: the transparent conductor forming the first electrode 106 is deposited onto textured substrate surface 132 in a conventional manner. The deposited electrode material substantially conforms to the textured substrate surface, so that the electrode surfaces themselves become textured. As with the structure shown in FIG. 13, surface modification layer 108 becomes textured as it conforms to textured surface 109 of the first electrode 106. Then, when a negative potential electrodeposits mirror metal 120, it substantially conforms to surface modification layer 108 and thereby forms the textured reflective surface which gives the device its diffusely reflecting characteristic. Texturing surface 109 of electrode 106 directly (as in FIG. 1), rather than through texturing surface 132 (as in FIG. 4), could result in local variations in the thickness, and consequently the electrical resistivity, of electrode 106, which might cause variations in the thickness of electrodeposit 120. Therefore, electrode 106 is preferably textured via the textured substrate surface 132, as shown in FIG. 4.

The invention is not limited to any particular texture pattern or amplitude on surface 109 of first electrode 106. It is only essential that the surface be non-planar on a microscopic or macroscopic scale so as to reduce the intensity of light reflected from mirror deposit 120 at the overall angle of incidence, neglecting the surface texture. A texture pattern containing no sharp points or ridges is preferred, to avoid the possibility of adversely affecting the conformal uniformity of the electrodeposited mirror metal 120. A smoothly textured surface also minimizes refractive losses for electrolytes having a refractive index that does not match that of surface modification layer 108 and electrode 106. For example, a textured surface featuring a pattern of rounded hills and troughs avoids undesirable sharp edges, while serving to reflect incoming light in a large number of different directions, thereby providing the device a low reflectivity in any given direction. Alternatively, a texture pattern could be used which reflects light more strongly in a particular desired direction. For example, sinusoidal surface waves in only one direction would diffuse light incident perpendicular to the waves more than that incident parallel with the waves. It may be necessary to texture the surface in a particular way and/or to a greater or lesser degree in order to provide a reflectivity pattern which complies with applicable standards. Texture can be introduced in the surface 132 of substrate 102 by a variety of means, including hot rolling with a textured roller, chemical etching from a vapor or liquid phase, and mechanical abrasion (e.g., bead blasting). Appropriate means of introducing texture into surface 109 of electrode 106 include chemical etching, mechanical abrasion, and patterned vapor deposition/sputtering of the electrode 106 transparent conducting film (using masks or directed deposition).

One possible embodiment of the textured surface of first electrode 106 is depicted in FIG. 5. The electrode lies in an x-y plane, with the full width of the textured surface 109 describing a sine wave 140 along the x-axis, and the full length of the surface describing another sine wave 142 along the y-axis. With surface waves of adequate amplitude and sufficiently short wavelength, incoming light 144 is highly diffused by this configuration.

Figure 6:
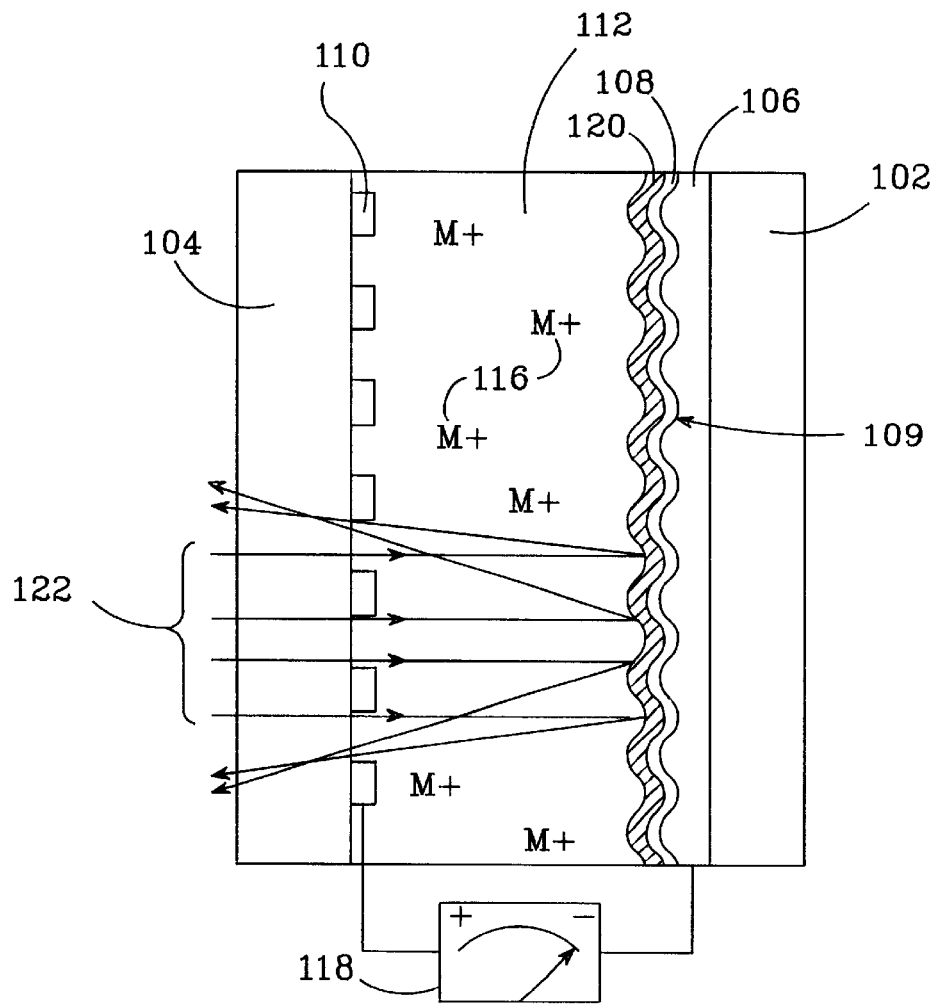
FIG. 6 is a cross sectional view of an alternative embodiment of the device shown in FIG. 2, in which radiation enters the device through the second electrode.

An alternative embodiment of the present invention is shown in FIG. 6, which is the same as FIG. 2 except that the incident light enters and exits the device through the second substrate 104, locally distributed second electrode 110, and the electrolyte 112, and is diffusely reflected from deposit 120.

Some embodiments of this invention may not require that the device transmit light, so that locally distributed electrode 110 could be replaced with a continuous electrode to simplify device fabrication or to enable other attributes. Such a variable reflectivity device might be used for aesthetic or camouflage purposes, for example. The second electrode in this case could be a solid metal, or be comprised of a coating of an electrochemically stable metal on an insulating or metallic substrate. The second electrode might be roughened to provide a dark appearance, yielding a device switchable between diffusely reflecting and absorbing states. On the other hand, the second electrode could also have a mirror finish, or be a REM electrode without texture, yielding a device switchable between diffuse and specular reflection. Alternatively, a colored dye could be incorporated in the electrolyte, yielding a device switchable between diffusely reflecting and colored states.

Fabrication of a Preferred Embodiment

The preferred first electrode utilizes a glass or plastic substrate which is uniformly coated on one side with an optically transparent, low resistivity (about 10 Ω/square) ITO (indium tin oxide) or FTO (fluorine-doped tin oxide) film. As noted above, the surface of the first electrode substrate is textured, which in turn textures the conforming ITO or FTO film. A thin film of an adherent electrochemically stable metal, such as Pt, is vapor deposited, preferably by sputtering, onto the ITO or FTO surface as a surface modification layer to enhance the rate of nucleation for metal deposition so as to yield a fine-grained electrodeposit with high reflectivity; other electrochemically stable metals can also be used, e.g., gold, palladium, rhodium, iridium, etc. It may be advantageous in some cases to employ a duplex metal film, e.g., Ti/Au or Cr/Au, in which the underlayer metal (e.g., Ti or Cr) serves to improve adhesion of the noble metal to the transparent conductor film. An electrical bus connection is formed around the perimeter of the ITO or FTO coating.

The preferred second electrode is locally-distributed in a grid or dot matrix pattern so that deposition of the mirror metal thereon has a minimal effect on the light transmission of the device. The second electrode can be either a grid of an electrochemically stable metal, e.g., Pt, deposited directly on the glass or plastic substrate, or a patterned stable metal nucleation layer deposited on a transparent conductor film, e.g., ITO or FTO, on the substrate. In the latter case, mirror metal deposition can be limited to the nucleation layer pattern (typically a dot array), since the overvoltage for metal deposition on transparent oxide conductors is typically higher than on nucleation layer metals, at least in some electrolytes. The exposed transparent conductor surface may be further deactivated against mirror metal electrodeposition by chemical modification, or by coating with an insulating layer. An excess of patterned mirror metal alone could be used as the second electrode, but the device would not be self-limiting with respect to voltage in this case since complete dissolution of the second electrode could occur at the operating voltage. An electrical bus connection is formed around the perimeter of the second electrode, making electrical connection to the metallic grid or to the ITO or FTO coating. Prior to cell assembly, the second electrode, if other than the mirror metal, is plated with a quantity of mirror metal sufficient to provide the desired amount of reflectivity when deposited on the first electrode, and possibly to prevent exposure of the second electrode metal to the electrolyte. Alternatively, the first electrode can be plated with all or part of the mirror metal prior to cell assembly.

The preferred electrolyte is a gelled electrolyte that is both chemically and electrochemically stable except with regard to electrodeposition of the mirror metal. Preferably, the mirror metal is silver added to the electrolyte as a silver halide and stabilized in the electrolyte by addition of an excess of halide ions derived from addition of a halide salt having a cation that is not electroactive (e.g., lithium, sodium, potassium, etc.). Other mirror metals having relatively low toxicity and good electrochemical characteristics include copper and bismuth. A mixture of halide ions (chloride, iodide, bromide) may be employed. The solvent is chosen with respect to its freezing and boiling point to provide the desired temperature operating range, as well as good electrolyte stability and good mirror cycling characteristics. Preferred solvents include water, dimethylsulfoxide (DMSO), ethylene glycol (EG), gamma-butyrolactone (GBL), dimethylformamide (DMF) and mixtures of these. In some cases, it may be necessary to add other species to improve the deposit properties, facilitate electron transfer, or stabilize the mirror metal in the electrolyte. For example, Ag(1+) and Cu(1+) can also be stabilized by nitrites, amines, phosphines, sulfur donors, etc., e.g. $[Cu(nitrile)_4]CF_3SO_3$. Additives that are electroactive or decomposed during electrodeposition of the mirror metal, such as organic compounds normally used for leveling and brightening electrodeposits, should be avoided since they would limit the mirror cycle life. Electrolytes based on majority anions other than halides may also be used.

Although the REM device of this invention can be fabricated using a liquid electrolyte, use of an electrolyte stiffener is preferred to facilitate device fabrication, to minimize electrolyte loss that may affect device performance or create a chemical safety hazard, and to adhesively hold glass fragments formed during accidental breakage that could otherwise cause physical personal injury. Preferred electrolyte stiffeners include organic gelling agents, e.g., polyacrylonitrile (PAN), polyvinylalcohol (PVA), polyvinylacetate (PVOAc), and polymethylmethacrylate (PMMA), which dissolve in liquid electrolytes to form transparent plastic-like gels at ambient temperatures. Ceramic fillers, e.g., highly dispersed silica, can also be used to thicken electrolytes, either alone or in combination with other gelling agents. With an appropriate amount of gelling agent, the electrolyte can retain most of the conductivity of the liquid electrolyte, yet be handled as a "solid state" component. The specific organic polymer gelling agent is chosen based on chemical and electrochemical compatibility with a given electrolyte and metal mirror formation/dissolution. Other possible electrolyte stiffeners include porous solid polymers that absorb large quantities of electrolyte, e.g., ormasils and porous polypropylene.

The reversible electrochemical cells of this invention can be fabricated using spacers and a polymer sealant, or using thick two-sided adhesive tape, a gasket or an o-ring to provide both the proper spacing and a seal. The spacer and seal materials must be chemically compatible with the electrolyte. Good results have been obtained with acrylic double-coated tapes, polypropylene spacers and silicone sealants. The preferred electrode separation is about 0.05–3.0 mm. Electrical contact is made to the metal bus on each electrode and connected to a voltage source for switching.

Features of the Invention

The reversible electrochemical mirror (REM) device of this invention involves electrodeposition and electrodissolution of mirror deposits on relatively transparent electrodes, and enables the reflectance (and transmission) of light and other radiation to be controlled over a wide range for smart window and adjustable reflectivity mirror applications. Key features of REM devices are the repeated formation of electrodeposits with mirror reflectivity, and the means for minimizing the optical interference from metal deposited on the counter electrode.

To attain the uniform metal deposition needed for mirror-like reflectivity, it is generally necessary to modify the surface of the transparent conducting film of the first electrode to improve nucleation, e.g., by vapor or sputter deposition of a very thin, yet optically transparent (~15–200 Å) "seed" layer of an electrochemically stable metal (e.g., platinum or gold). This seed layer minimizes mirror metal deposition overvoltage and enhances the rate of nucleation so that mirror deposits are obtained. Other surface treatments (e.g., electrodeposition of an inert metal layer) could be used to improve metal nucleation and provide mirror deposits. In order to be effective for producing mirror deposits, the nucleation layer must be microscopically continuous, which may not be the case for some metallization treatments on some transparent conductor substrates. For example, the two-step process commonly used to metallize printed wiring boards prior to copper plating (involving palladium displacement of adsorbed tin ions) may not produce sufficiently continuous films with adequate adhesion. For special effects, e.g., a decorative mirror design, the transparent conductor (e.g., ITO or FTO) and/or the metal nucleation layer can be patterned as desired.

Also useful in attaining a mirror deposit are additives that adsorb on the electrode surface, thereby inhibiting the metal deposition process, and additives that complex the mirror metal ions, thereby raising the overvoltage for metal deposition. Most of the organic addition agents used in the plating industry to brighten and level deposits, however, are electrochemically consumed during the mirror metal deposition/dissolution process and would be inappropriate. Inorganic additives are preferred for REM devices.

A major feature of the present invention is the use of mechanical texturing of the mirror electrode surface in REM devices such that incident radiation is diffusely reflected so as to avoid specular reflection that may create a safety hazard for some smart window applications. The mirror electrode is textured by chemical or mechanical treatment, or by conformal coating of a textured substrate, so that light incident from a given direction is reflected at different angles depending on the location on the electrode surface. Smooth texturing, without sharp peaks or edges, is desirable to avoid nonuniform mirror metal electrodeposition, and to minimize light refraction effects and multiple reflection losses.

No chemically reactive species are produced in REM devices, since the same metal deposition/dissolution reaction occurs at both electrodes. As a result, a particular switched state is maintained indefinitely at open circuit if oxidizing contaminants are excluded from the cell.

The REM device of this invention is basically electroreflective (light reflection changed by application of voltage), rather than electrochromic (light absorption changed by applied voltage) as is typical of the devices taught in the prior art.

The REM device is operated well within the electrolyte stability region, so that excessive mirror metal plating or deplating is not harmful. In fact, the device is self-limiting for the reflective electrode when biased within the voltage stability region, since the current will practically cease when the deposited mirror metal is depleted at that electrode. By limiting the amount of mirror metal deposited prior to cell assembly, overplating of the first electrode under a protracted applied voltage can also be precluded.

No cell separator is required, since the same redox couple (metal deposition/dissolution) involving a solid product is used at both electrodes, so that side reactions are avoided. On the other hand, a porous cell separator, e.g., porous polypropylene, may be used to provide a matrix for containing a liquid electrolyte and to prevent shorting of the two electrodes in the event of extreme flexure of the cell.

A wide temperature operating range is obtained by using electrolytes based on high boiling organic solvents, e.g., dimethylsulfoxide, ethylene glycol, propylene carbonate, sulfolane, γ-butyrolactone, tetraglyme, etc. Use of mixtures of these solvents, including those involving water, can extend the temperature range to lower operating temperatures.

Use of a solid electrolyte which incorporates an electrochemically inert polymer stiffener or gelling agent facilitates REM device fabrication, minimizes the possibility of chemical or physical personal injury, and reduces sensitivity to cell leakage and atmospheric contamination by preventing convectional transport.

An alternative method of suppressing specular reflection by a REM device is to roughen the outer surface of the electrode substrate through which the radiation passes before and after being reflected by the mirror electrode. A similar approach would be to incorporate particulates or other localized compositional variations within the bulk of this electrode substrate. Such substrate modifications would diminish device reflectivity in a given direction by scattering radiation, but would also render the device translucent rather than substantially transparent, which would not be acceptable for most applications. Note that tinting the substrate material would decrease the overall amount, but not the specularity, of light reflected from REM devices, and would result in heating of the device itself by absorbed radiation. Likewise, an ineffective surface modification layer would tend to decrease specularity but would also result in absorption of radiation by the device itself.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

What is claimed is:

1. A reversible electrochemical mirror (REM) device for controlling the amount and direction of reflected electromagnetic radiation, comprising:

a first substrate which is substantially transparent to at least a portion of the spectrum of electromagnetic radiation;

a first electrode disposed on the first substrate which is substantially transparent to the radiation, the surface of the first electrode not adjacent to the first substrate being textured on a microscopic or macroscopic scale;

a surface modification layer disposed on the first electrode which substantially conforms to the textured surface;

a second electrode;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal disposed on at least one of the first or the second electrode;

such that a negative electrical potential applied to the first electrode relative to the second electrode causes deposited metal to be dissolved from the second electrode into the solution and to be electrodeposited from the solution onto the textured surface of the first electrode, the surface modification layer facilitating substantially uniform nucleation of the electrodeposited metal on the first electrode, and such that a positive electrical potential applied to the first electrode relative to the second electrode causes deposited metal to be dissolved from the textured surface of the first electrode and electrodeposited from the solution onto the second electrode, and such that the amount of deposited metal subsisting on the first electrode affects the reflectivity of the device for the radiation, and such that metal deposited on the textured surface of the first electrode reflects radiation incident from at least some directions diffusely.

2. The device of claim 1, wherein the surface of the first substrate adjacent to the first electrode is textured, the first electrode conforming to the textured surface of the first substrate, and the surface modification layer conforming to the textured surface of the first electrode.

3. The device of claim 1, wherein the textured surface of the first electrode includes no sharp points or ridges so that the conformal uniformity of the metal layer electrodeposited onto the textured surface is not adversely affected by the texturing.

4. The device of claim 1, wherein the textured surface of the first electrode comprises a pattern of rounded hills and troughs such that light which is specular when it strikes the textured surface is non-specular when reflected by the textured surface.

5. The device of claim 1, wherein the first electrode lies in an x-y plane, the textured surface of the first electrode describing a first sine wave along the plane's x-axis and describing a second sine wave along the plane's y-axis such that light that is specular when it strikes the textured surface is non-specular when reflected by the textured surface.

6. The device of claim 1, further comprising:
a second substantially transparent substrate, the second electrode being distributed on the second substrate in localized areas and being substantially transparent to the radiation.

7. The device of claim 6, wherein the second substrate is an electrically insulating substrate and the second electrode is a continuous electrical conductor.

8. The device of claim 7, wherein the second electrode is arranged in a conductive mesh or grid pattern.

9. The device of claim 6, wherein the second electrode is a discontinuous metallic film on a substantially transparent electrical conductor.

10. The device of claim 9, wherein the discontinuous metallic film of the second electrode is arranged in a dot matrix pattern.

11. The device of claim 6, wherein the second electrode is an electrically continuous grid of an electrochemically stable metal deposited on the second substrate.

12. The device of claim 11, wherein the electrochemically stable metal of the second electrode includes at least one metal selected from the group consisting of Au, Cr, Ir, Ni, Os, Pd, Pt, Re, Rh, Ru and stainless steel.

13. The device of claim 6, filter comprising an underlayer between the second electrode and the second substrate to improve adhesion between the second electrode and the second substrate.

14. The device of claim 13, wherein the underlayer includes at least one metal selected from the group consisting of aluminum, chromium, hafliumn, molybdenum, nickel, titanium, tungsten and zirconium.

15. The device of claim 1, wherein the first electrode is disposed uniformly on the first substrate.

16. The device of claim 1, wherein the first electrode is an electrically conductive oxide coating deposited on the first substrate.

17. The device of claim 16, wherein the electrically conductive oxide coating is selected from the group consisting of aluminum (doped) zinc oxide, antimony (doped) tin oxide, fluorine (doped) tin oxide, indium oxide, indium tin oxide, fluorine (doped) indium oxide, aluminum (doped) tin oxide, phosphorus (doped) tin oxide, and indium zinc oxide.

18. The device of claim 1, wherein the surface modification layer is a thin layer of a metal which is electrochemically more stable towards oxidation in the electrolytic solution than the electrodeposited metal.

19. The device of claim 18, wherein the stable metal layer includes at least one metal selected from the group consisting of Au, Ir, Os, Pd, Pt, Re, Rh and Ru.

20. The device of claim 1, further comprising an underlayer between the first electrode and the surface modification layer to improve adhesion between the first electrode and the surface modification layer.

21. The device of claim 20, wherein the underlayer includes at least one metal selected from the group consisting of aluminum, chromium, hafnium, molybdenum, nickel, titanium, tungsten and zirconium.

22. The device of claim 6, wherein at least one of the first and second substrates are glass.

23. The device of claim 6, wherein at least one of the first and second substrates are a plastic.

24. The device of claim 23, wherein the plastic substrates are selected from the group consisting of acrylics, urethanes, polystyrenes, polycarbonates, styrene-acrylonitrile copolymers, styrene-butadiene copolymers, cellulosics, acrylonitrilebutadiene-styrene, polyvinylchloride, thermoplastic polyesters, polypropylene, nylons, polyester carbonates, ionomers, polyethyleneterephthate, and cyclic olefin copolymers.

25. The device of claim 1, wherein the electrolytic solution is a solution containing water.

26. The device of claim 25, wherein the electrolytic solution further comprises a gelling agent to form a gel electrolyte.

27. The device of claim 26, wherein the gelling agent is selected from the group consisting of gelatin, polyacrylamide, polyacrylates derived from polyacrylic acid, polyvinylalcohol, polyvinylpyrrolidone, cellulose derivatives, polyethylene glycols, polyethylene oxides, pectin, tragacanth, alginates, starches, xanthan gum, guar gum, acacia, cetostearyl alcohol, highly dispersed silica, and bentonite.

28. The device of claim 25, wherein the electrolytic solution is contained within a solid matrix.

29. The device of claim 28, wherein the solid matrix is selected from the group consisting of finely divided electrically insulating powders, porous polymers, insulating sponges, insulating felts, and ormasils.

30. The device of claim 1, wherein the electrolytic solution is a non-aqueous solution.

31. The device of claim 30, wherein the electrolytic solution further comprises an electrochemically inert gelling agent to form a non-aqueous gel electrolyte.

32. The device of claim 31, wherein the gelling agent is a soluble polymer.

33. The device of claim 32, wherein the soluble polymer gelling agent is selected from the group consisting of polyacrylamide, polyacrylic acid, polyacrylonitrile, polycarbonate resin, polymethylmethacrylate, polypropylenecarbonate, polyvinylalcohol, polystyrenes, polyvinylchloride, polyvinylidinefluoride, and polyvinylpyrrolidone.

34. The device of claim 30, wherein the electrolytic solution is contained within a solid matrix.

35. The device of claim 34, wherein the solid matrix is selected from the group consisting of finely divided electrically insulating powders, porous polymers, insulating sponges, insulating felts, and ormasils.

36. The device of claim 1, wherein the electrodepositable metal ions are selected from the group consisting of $Ag^+$, $Bi^{3+}$, $Cu^{+/2+}$, $Cd^{2+}$, $Hg^{2+}$, $In^{3+}$, $Pb^{2+}$, $Sb^{3+}$, $Tl^{+/3+}$, $Sn^{2+/4+}$, and $Zn^{2+}$.

37. The device of claim 1, wherein the electrolytic solution includes at least one solvent selected from the group consisting of benzonitrile, dimethylcarbonate, dimethylsulfoxide, ethylene carbonate, ethylene glycol, γ-butyrolactone, glycerol, propylene carbonate, sulfolane, tetraglyme, dimethylformamide, and water.

38. The device of claim 1, wherein the electrolytic solution further comprises a complexing species for chemically stabilizing the electrodepositable metal ion in solution, thereby facilitating the electrodeposition of a substantially uniform layer of the metal on the first electrode and the electrodissolution of that layer.

39. The device of claim 38, wherein the complexing species is selected from the group consisting of aromatic and olefinic compounds, aromatic nitrites, benzonitrile, aromatic heterocyclic amines, aromatic heterocyclic sulfides, quinoline, aliphatic amines, aromatic amines, organonitriles, organo-phosphines, organo-thiols, organo-sulfides, halide ions, polyhydric alcohols, succinimide, and pseudohalides.

* * * * *